(12) United States Patent
Tsai

(10) Patent No.: US 12,520,313 B2
(45) Date of Patent: Jan. 6, 2026

(54) USER EQUIPMENT AND COMMUNICATION METHODS FOR SEMI-STATIC DL SCHEDULING

(71) Applicant: MEDIATEK INC., Hsinchu (TW)

(72) Inventor: Cheng-Rung Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 468 days.

(21) Appl. No.: 17/998,066

(22) PCT Filed: May 14, 2021

(86) PCT No.: PCT/CN2021/093765
§ 371 (c)(1),
(2) Date: Nov. 7, 2022

(87) PCT Pub. No.: WO2021/228212
PCT Pub. Date: Nov. 18, 2021

(65) Prior Publication Data
US 2023/0180234 A1    Jun. 8, 2023

Related U.S. Application Data

(60) Provisional application No. 63/025,243, filed on May 15, 2020.

(51) Int. Cl.
*H04W 4/00*         (2018.01)
*H04W 72/1273*    (2023.01)
(Continued)

(52) U.S. Cl.
CPC ..... *H04W 72/1273* (2013.01); *H04W 72/231* (2023.01); *H04W 72/232* (2023.01)

(58) Field of Classification Search
CPC .......... H04W 72/1273; H04W 72/231; H04W 72/232
See application file for complete search history.

(56) References Cited

U.S. PATENT DOCUMENTS

| 10,841,914 B2* | 11/2020 | Liou ..................... H04L 5/0094 |
| 2019/0149269 A1* | 5/2019 | Chatterjee ............. H04L 5/0094 370/329 |

(Continued)

FOREIGN PATENT DOCUMENTS

| EP | 3606243 A1 | 2/2020 |
| WO | 2016/123402 A1 | 8/2016 |

OTHER PUBLICATIONS

Extended European Search Report dated Apr. 25, 2024, issued in application No. EP 21804386.7.

(Continued)

*Primary Examiner* — Abdelnabi O Musa
(74) *Attorney, Agent, or Firm* — McClure, Qualey & Rodack, LLP

(57) ABSTRACT

User equipment (UE) for semi-static downlink (DL) scheduling is provided. The UE may include a radio frequency (RF) signal processing device and a processor. The RF signal processing device is configured to receive radio resource control (RRC) information from a base station. The processor is coupled to the RF signal processing device. When the RF signal processing device receives a first configuration of a semi-static DL scheduling and a higher layer parameter from the RRC information, the processor determines not to receive the semi-static DL scheduling in a set of symbols if the RF signal processing device does not receive a downlink control information (DCI) from the base station.

20 Claims, 4 Drawing Sheets

(51) Int. Cl.
*H04W 72/231* (2023.01)
*H04W 72/232* (2023.01)

(56) References Cited

U.S. PATENT DOCUMENTS

| | | | | |
|---|---|---|---|---|
| 2019/0261454 | A1* | 8/2019 | Xiong | H04L 5/0094 |
| 2020/0021421 | A1* | 1/2020 | Han | H04W 52/367 |
| 2020/0092880 | A1* | 3/2020 | Choi | H04L 27/2602 |
| 2020/0351847 | A1* | 11/2020 | Kim | H04L 5/0094 |
| 2022/0272557 | A1* | 8/2022 | Liu | H04W 76/20 |
| 2023/0024992 | A1* | 1/2023 | Kim | H04L 5/0051 |
| 2023/0354275 | A1* | 11/2023 | Moon | H04W 74/0808 |

OTHER PUBLICATIONS

Samsung; "UE Behavior for UE-Group Common PDCCH Detection;" 3GPP TSG RAN WG1 #90; Aug. 2017; ps. 1-2.
International Search Report and Written Opinion dated Aug. 13, 2021, issued in application No. PCT/CN2021/093765.
Apple Inc; "Remaining issues of DL signals and channels;" 3GPP TSG-RAN WG1 #100b-eMeeting R1-2002320; Apr. 2020; pp. 1-5.
VIVO; "Remaining issues on physical DL channel design in unlicensed spectrum;" 3GPP TSG RAN WG1 #100bis R1-2001650; Apr. 2020; pp. 1-4.
Spreadtrum Communications; "Remaining issues in DL signals and channels;" 3GPP TSG RAN WG1 #100bis R1-2002275; Apr. 2020; pp. 1-3.
OPPO; "Discussion on the remaining issues of DL signals and channels;" 3GPP TSG RAN WG1 #100bis-E R1-2001757; May 2020; pp. 1-8.

\* cited by examiner ly. It is designed to better support mobile broadband Internet access

USER EQUIPMENT AND COMMUNICATION METHODS FOR SEMI-STATIC DL SCHEDULING

CROSS REFERENCE TO RELATED APPLICATIONS

This Application claims priority of U.S. Provisional Patent Application No. 63/025,243, filed on May 15, 2020, the entirety of which is incorporated by reference herein.

FIELD OF THE INVENTION

The invention generally relates to wireless communication technology, and more particularly, to wireless communication technology for a semi-static downlink (DL) scheduling.

DESCRIPTION OF THE RELATED ART

GSM/GPRS/EDGE technology is also called 2G cellular technology, WCDMA/CDMA-2000/TD-SCDMA technology is also called 3G cellular technology, and LTE/LTE-A/TD-LTE technology is also called 4G cellular technology. These cellular technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In 5G NR, due to uncertainty of channel access in unlicensed bands, it is difficult for the UE to determine the presence of semi-static downlink (DL) scheduling from the network. Therefore, the UE may need to perform blind detections for semi-static DL scheduling. This may increase power consumption and reduce the measurement accuracy. Therefore, a validation method for semi-static DL scheduling is necessary.

BRIEF SUMMARY OF THE INVENTION

User equipment (UE) and communication methods for semi-static downlink (DL) scheduling are provided to overcome the problems mentioned above.

An embodiment of the invention provides user equipment (UE) for semi-static DL scheduling. The UE may comprise a radio frequency (RF) signal processing device and a processor. The RF signal processing device is configured to receive radio resource control (RRC) information from a base station. The processor is coupled to the RF signal processing device. When the RF signal processing device receives a first configuration of a semi-static DL scheduling and a higher layer parameter from the RRC information, the processor determines not to receive the semi-static DL scheduling in a set of symbols if the RF signal processing device does not receive a downlink control information (DCI) from the base station.

In an embodiment of the invention, the semi-static DL scheduling comprises a periodic channel-state-information reference-signal (P-CSI-RS) resource, a semi-persistent CSI-RS (SP-CSI-RS) resource, or a semi-persistent scheduled physical-data shared-channel (SPS-PDSCH).

In an embodiment of the invention, the first configuration of the semi-static DL scheduling tells the UE to receive the semi-static DL scheduling in the set of symbols according to a periodicity.

In an embodiment of the invention, the higher layer parameter indicates that a UE behavior to determine how to perform reception of the semi-static DL scheduling is enabled. The DCI schedules a downlink channel or a downlink signal in the set of symbols. The downlink channel or the downlink signal is not the semi-static DL scheduling.

In an embodiment of the invention, the RF signal processing device is further configured to receive a second configuration that provides a slot-format-indicator (SFI) index field in a specific DCI format. In an embodiment of the invention, the RF signal processing device is further configured to receive a third configuration that provides a channel occupancy (CO) duration field in the specific DCI format. When the RF signal processing device receives the first configuration of the semi-static DL scheduling and the higher layer parameter, but not receives the second configuration and/or the third configuration, the processor determines not to receive the semi-static DL scheduling in the set of symbols if the RF signal processing device does not receive the DCI.

An embodiment of the invention provides a communication method for semi-static DL scheduling. The communication method for semi-static DL scheduling is applied to user equipment (UE). The communication method for semi-static DL scheduling comprises the following step: a radio frequency (RF) signal processing device of the UE receives radio resource control (RRC) information; and when the RF signal processing device receives a first configuration of a semi-static DL scheduling and a higher layer parameter from the RRC information, a processor of the UE determines not to receive the semi-static DL scheduling in a set of symbols if the RF signal processing device does not receive a downlink control information (DCI) from a base station.

An embodiment of the invention provides a communication method for semi-static DL scheduling. The communication method for semi-static DL scheduling is applied to a base station. The communication method for semi-static DL scheduling comprises the following step: the base station transmits a radio resource control (RRC) information and a downlink control information (DCI) to tell a user equipment (UE) to receive the semi-static DL scheduling, wherein the base station transmits a first configuration of a semi-static DL scheduling and a higher layer parameter through the RRC information.

Other aspects and features of the invention will become apparent to those with ordinary skill in the art upon review of the following descriptions of specific embodiments of UE and communication methods for semi-static DL scheduling.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
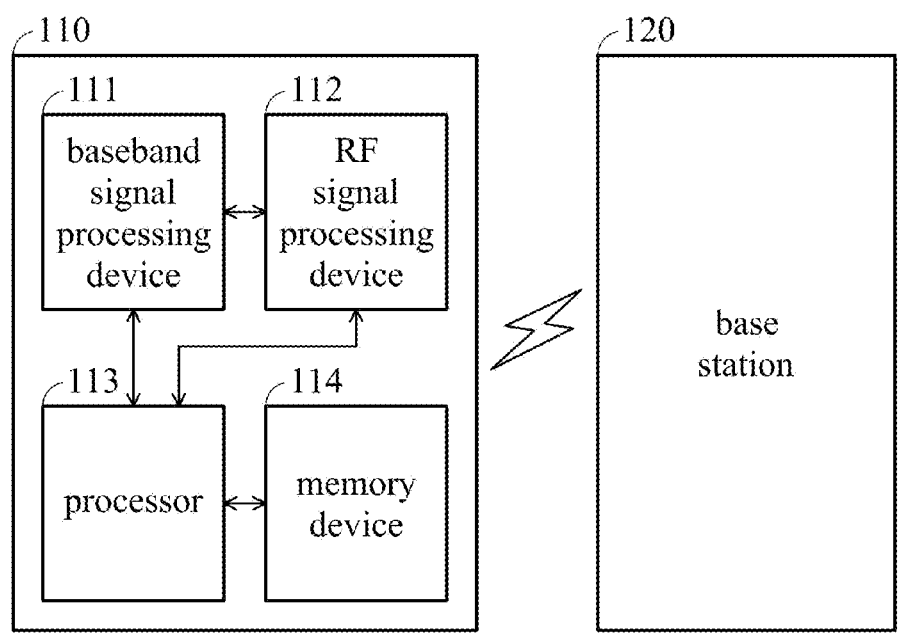
FIG. 1 is a block diagram of a wireless communications system 100 according to an embodiment of the invention.

FIG. 1 is a block diagram of a wireless communications system 100 according to an embodiment of the invention. As shown in FIG. 1, the wireless communications system 100 may comprise user equipment (UE) 110 and a base station 120. It should be noted that, in order to clarify the concept of the invention, FIG. 1 presents a simplified block diagram in which only the elements relevant to the invention are shown. However, the invention should not be limited to what is shown in FIG. 1.

As shown in FIG. 1, the UE 110 may comprise at least a baseband signal processing device 111, a radio frequency (RF) signal processing device 112, a processor 113, a memory device 114, and an antenna module comprising at least one antenna. It should be noted that, in order to clarify the concept of the invention, the UE 110 of FIG. 1 presents a simplified block diagram in which only the elements relevant to the invention are shown. However, the invention should not be limited to what is shown in FIG. 1.

In the embodiments of the invention, the UE 110 may be a smartphone, a Personal Data Assistant (PDA), a pager, a laptop computer, a desktop computer, a wireless handset, or any computing device that includes a wireless communications interface.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, an analog-to-digital converter (ADC) and a digital-to-analog converter (DAC), etc.

The baseband signal processing device 111 may further process the baseband signals to obtain information or data transmitted by the peer communications apparatus. The baseband signal processing device 111 may also comprise a plurality of hardware elements to perform baseband signal processing.

The processor 113 may control the operations of the baseband signal processing device 111 and the RF signal processing device 112. According to an embodiment of the invention, the processor 113 may also be arranged to execute the program codes of the software modules of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software modules.

The memory device 114 may store the software and firmware program codes, system data, user data, etc. of the UE 110. The memory device 114 may be a volatile memory such as a random access memory (RAM); a non-volatile memory such as a flash memory or a read-only memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). It should be noted that, in some embodiments of the invention, the UE 110 may be extended further to comprise more than one antenna and/or more than one radio module, and the invention should not be limited to what is shown in FIG. 1.

In the embodiments, the base station 120 may be a gNodeB (gNB), a NodeB (NB) an eNodeB (eNB), an access point, or an access terminal, but the invention should not be limited thereto. In the embodiments, the UE 110 may communicate with the base station 120 through the fifth generation (5G) communication technology or 5G New Radio (NR) communication technology, but the invention should not be limited thereto.

In the embodiments of the invention, the base station 120 may schedule or transmit the semi-static DL scheduling to the UE 110 through the higher layer (e.g. a radio resource control (RRC) layer).

In the embodiments of the invention, the semi-static DL scheduling may comprise a periodic channel-state-information reference-signal (P-CSI-RS) resource, a semi-persistent CSI-RS (SP-CSI-RS) resource, or a semi-persistent scheduled physical-data shared-channel (SPS-PDSCH), but the invention should not be limited thereto.

In an embodiment of the invention, when the base station 120 needs to tell the UE 110 to receive the semi-static DL scheduling (i.e. the UE 110 needs to perform the corresponding DL reception), the base station 120 may transmit a first configuration (or an activation command or an activation signaling) of the semi-static DL scheduling in a set of symbols and transmit a second configuration that provides a slot-format-indicator (SFI) index field in a specific downlink control information (DCI) format and/or a third configuration that provides a channel occupancy (CO) duration field in the specific DCI format to the UE 110. In the embodiment of the invention, the base station 120 may transmit the first configuration through RRC information. In addition, the base station 120 may transmit the second configuration and/or the third configuration through the RRC information. In the embodiment of the invention, the first configuration (or an activation command or an activation signaling) of the semi-static DL scheduling may indicate that the UE 110 needs to receive the semi-static DL scheduling in the set of symbols according to at least one periodicity and indicates the time occasion for semi-static DL scheduling in each periodicity. Furthermore, in the embodiment of the invention, the second configuration (i.e. SFI index field in the specific DCI format) and/or third configuration (i.e. the CO duration field in the specific DCI format) is configured to provide a duration to the UE 110. Specifically, the SFI-index field and/or the CO duration field may indicate a duration in which the UE 110 needs to receive the semi-static DL scheduling in the set of symbols, i.e. the SFI-index field and/or the CO duration field may indicate a duration which belongs to a channel occupancy initiated by the network.

When the UE 110 obtains the duration, the UE 110 will know that presence of the semi-static DL scheduling. Therefore, the UE 110 may perform semi-static DL scheduling during the aforementioned duration. The UE 110 may not be receiving the semi-static DL scheduling outside of the aforementioned duration, i.e. the UE 110 may cancel the semi-static DL scheduling.

In another embodiment of the invention, when the base station 120 needs to tell the UE 110 to receive the semi-static DL scheduling (i.e. the UE 110 needs to perform the corresponding DL reception), the base station 120 may transmit the first configuration (or an activation command or an activation signaling) for semi-static DL scheduling in the set of symbols, a higher layer parameter, and a DCI to the UE 110. In the embodiment of the invention, as described above, the first configuration (or an activation command or an activation signaling) of the semi-static DL scheduling may indicate that the UE 110 needs to receive the semi-static DL scheduling according to at least one periodicity and indicates the time occasion for semi-static DL scheduling in each periodicity. In the embodiment of the invention, the base station 120 may transmit the first configuration through RRC information.

Furthermore, in the embodiment of the invention, the higher layer parameter may indicate that a UE behavior to determine how to perform the reception of the semi-static DL scheduling is enabled (e.g. the higher layer parameter may be set to a value that enables the UE behavior). That, is to say, if the UE behavior to determine how to perform the reception of the semi-static DL scheduling is enabled, the UE 110 may receive semi-static DL scheduling (i.e. perform the semi-static DL scheduling reception) in the set of symbols only when the UE 110 receives both of the first configuration of the semi-static DL scheduling in the set of symbols and the DCI.

Figure 2:
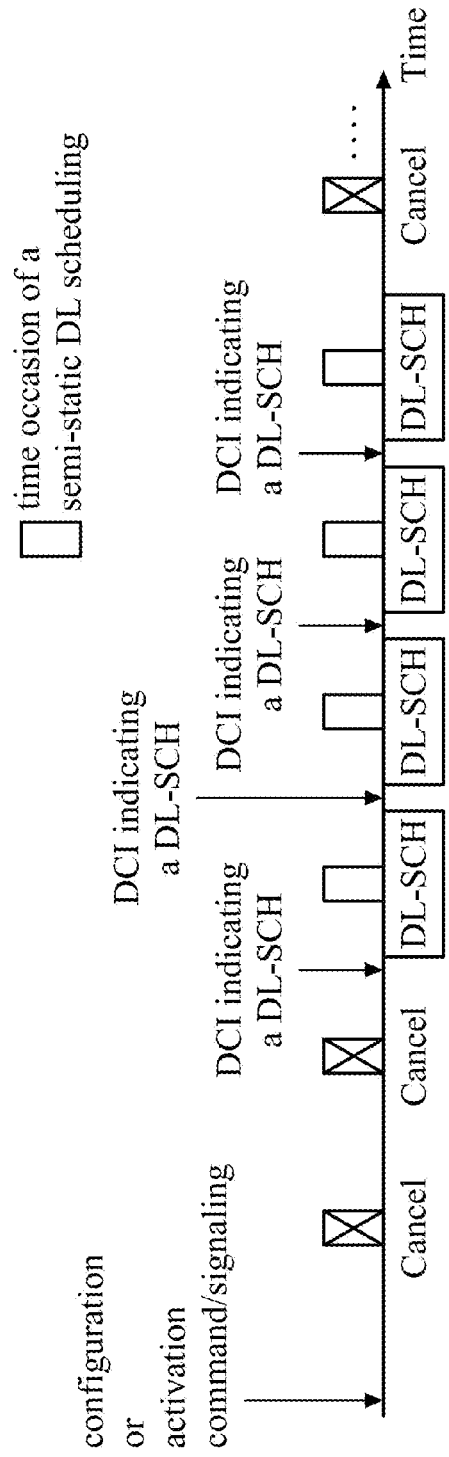
FIG. 2 is a schematic diagram of performing a semi-static DL scheduling according to an embodiment of the invention.

In addition, in the embodiment, the DCI may schedule a downlink channel (e.g. PDSCH) or a downlink signal (e.g. CSI-RS) in the set of symbols for semi-static DL scheduling. The downlink channel (e.g. PDSCH) and the downlink signal (e.g. CSI-RS) are not semi-static DL scheduling. In addition, the downlink channel (e.g. PDSCH) or the downlink signal (e.g. CSI-RS) scheduled by the DCI may fully overlap the semi-static DL scheduling corresponding to the configuration of the semi-static DL scheduling in time domain. When the UE 110 obtains the DCI, the UE 110 will know that semi-static DL scheduling is present. Therefore, when the UE 110 receives the DCI, the UE 110 may perform semi-static DL scheduling reception in the set of symbols. When the UE 110 does not receive the DCI, the UE 110 will not receive the semi-static DL scheduling in the set of symbols, i.e. the UE 110 will cancel the semi-static DL scheduling. FIG. 2 is taken as an example to illustrate the embodiment below.

FIG. 2 is a schematic diagram of performing a semi-static DL scheduling according to an embodiment of the invention. In the embodiment of FIG. 2, it is assumed that the UE 110 receives the higher layer parameter, i.e. the UE behavior to determine how to perform the reception of the semi-static DL scheduling is enabled. As shown in FIG. 2, the base station 120 may transmit the first configuration (or an activation command or an activation signaling) of the semi-static DL scheduling in the set of symbols to the UE 110. The first configuration (or an activation command or an activation signaling) of the semi-static DL scheduling may indicate that the UE 110 needs to receive the semi-static DL scheduling in the set of symbols according to at least one periodicity and indicates the time occasion for semi-static DL scheduling in each periodicity. When the UE 110 receives the DCI from the base station 120, the UE 110 may perform semi-static DL scheduling reception in the set of symbols. When the UE 110 does not receive the DCI from the base station 120, the UE 110 may not receive the semi-static DL scheduling in the set of symbols, i.e. the UE 110 may cancel the semi-static DL scheduling reception. In addition, as shown in FIG. 2, the DCI schedules a downlink channel (e.g. DL-SCH) that may fully overlap the semi-static DL scheduling in each periodicity configured in the configuration of the semi-static DL scheduling.

In an embodiment of the invention, an RF signal processing device 112 may be configured to receive the configuration of the semi-static DL scheduling, the higher layer parameter, the DCI, the second configuration and the third configuration from the base station 120. In an embodiment of the invention, when the RF signal processing device 112 receives the first configuration of the semi-static DL scheduling and the higher layer parameter through the RRC information from the base station 120, the processor 113 may determine not to receive the semi-static DL scheduling in the set of symbols according to the first configuration if the RF signal processing device 112 does not receive the DCI, i.e. the UE 110 may cancel the semi-static DL scheduling reception. In another embodiment of the invention, when the RF signal processing device 112 receives the first configuration of the semi-static DL scheduling and the higher layer parameter through the RRC information from the base station 120, but does not receive the second configuration and/or the third configuration through the RRC information from the base station 120, the processor 113 may determine not to receive the semi-static DL scheduling in the set of symbols according to the first configuration if the RF signal processing device 112 does not receive the DCI, i.e. the UE 110 may cancel the semi-static DL scheduling reception.

Figure 3:
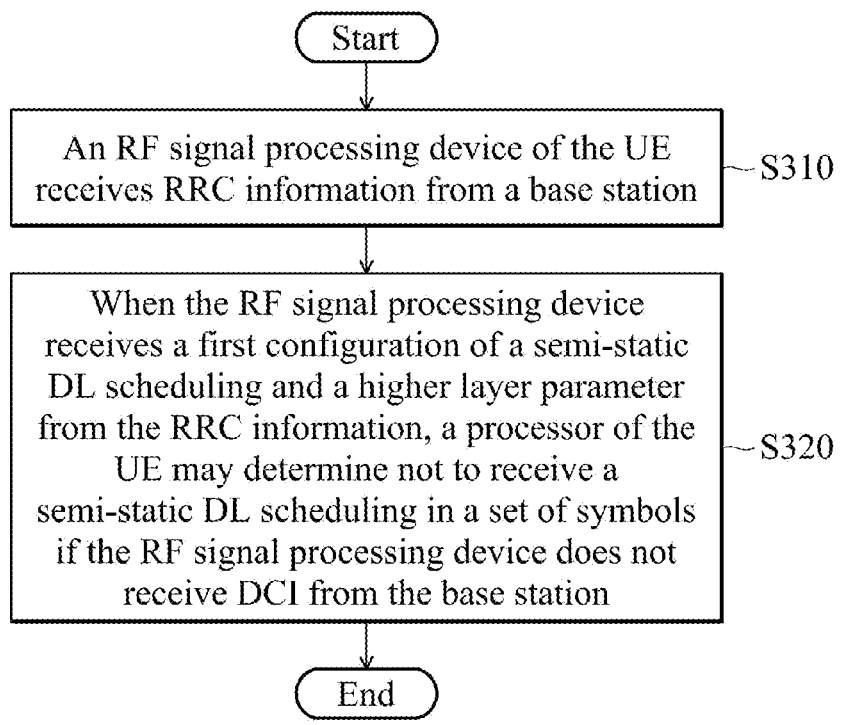
FIG. 3 is a flow chart 300 illustrating a communication method for semi-static DL scheduling according to an embodiment of the invention.

FIG. 3 is a flow chart 300 illustrating a communication method for semi-static DL scheduling according to an embodiment of the invention. The communication method for semi-static DL scheduling can be applied to the UE 110 of the communication system 100. As shown in FIG. 3, in step S310, a radio frequency (RF) signal processing device of the UE 110 receives radio resource control (RRC) information from a base station 120 of the communication system 100.

In step S320, when the RF signal processing device of the UE 110 receives a first configuration of a semi-static DL scheduling and a higher layer parameter through the RRC information from the base station 120 of the communication system 100, a processor of the UE 110 may determine not to receive a semi-static DL scheduling in the set of symbols if the RF signal processing device of the UE 110 does not receive downlink control information (DCI) from the base station 120.

In the communication method, the RF signal processing device of the UE 110 is further configured to receive a second configuration and/or a third configuration from the RRC information. The second configuration provides a slot-format-indicator (SFI) index field in a specific DCI format. The third configuration provides a channel occupancy (CO) duration field in the specific DCI format. In the communication method, when the RF signal processing device of the UE 110 receives the first configuration of the semi-static DL scheduling and the higher layer parameter from the RRC information, but not receives the second configuration and/or the third configuration from the RRC information, the processor of the UE 110 may determine not to receive the semi-static DL scheduling in the set of symbols if the RF signal processing device does not receive the DCI.

Figure 4:
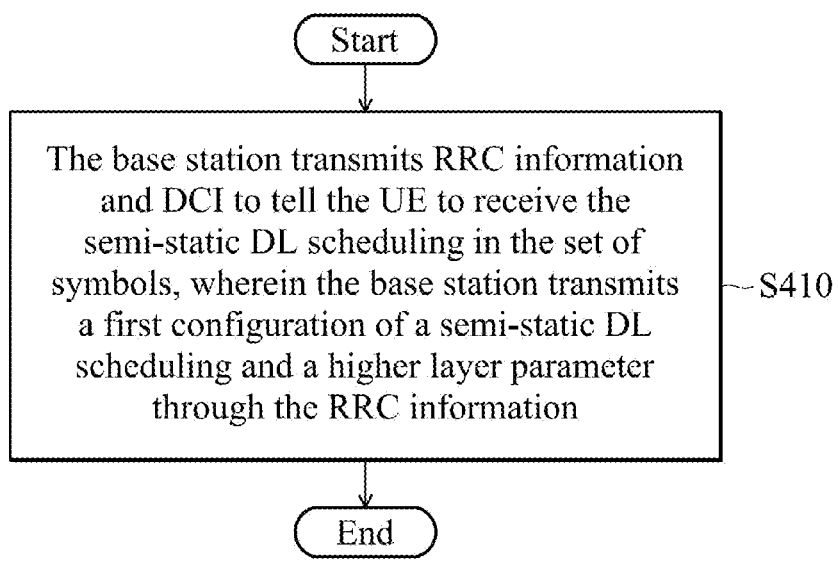
FIG. 4 is a flow chart 400 illustrating a communication method for semi-static DL scheduling according to another embodiment of the invention.

FIG. 4 is a flow chart 400 illustrating a communication method for semi-static DL scheduling according to an embodiment of the invention. The communication method for semi-static DL scheduling can be applied to the base station 120 of the communication system 100. As shown in FIG. 4, in step S410, the base station 120 may transmit a radio resource control (RRC) information and downlink control information (DCI) to tell the UE 110 of the communication system 100 to receive the semi-static DL scheduling in the set of symbols, wherein the base station 120 may transmit a first configuration of a semi-static DL scheduling and a higher layer parameter through the RRC information.

In the communication method, base station 120 may further transmit the a second configuration that provides a slot-format-indicator (SFI) index field in a specific DCI format and/or a third configuration that provides a channel occupancy (CO) duration field in the specific DCI format to the UE 110.

In the communication methods for semi-static DL scheduling provided in the invention, in the unlicensed band, the UE will know that semi-static DL scheduling is present based on the DCI or the specific DCI. That is to say, in the communication methods for semi-static DL scheduling provided in the invention, the UE will not need to perform blind detections for semi-static DL scheduling. This can reduce power consumption and avoid the degradation of the measurement accuracy for the blind detections.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

The invention claimed is:

1. A user equipment (UE), comprising:
   a radio frequency (RF) signal processing device, configured to receive a radio resource control (RRC) information from a base station; and
   a processor, coupled to the RF signal processing device, wherein when the RF signal processing device receives a first configuration of a semi-static downlink (DL) scheduling and a higher layer parameter from the RRC information, the processor determines not to receive the semi-static DL scheduling in a set of symbols in an event that the RF signal processing device does not receive a downlink control information (DCI) for the semi-static DL scheduling from the base station.

2. The UE of claim 1, wherein the semi-static DL scheduling comprises a periodic channel-state-information reference-signal (P-CSI-RS) resource, a semi-persistent CSI-RS (SP-CSI-RS) resource or a semi-persistent scheduled physical-data shared-channel (SPS-PDSCH).

3. The UE of claim 1, wherein the first configuration of the semi-static DL scheduling tells the UE to receive the semi-static DL scheduling in the set of symbols according to a periodicity.

4. The UE of claim 1, wherein the higher layer parameter indicates that a UE behavior to determine how to perform reception of the semi-static DL scheduling is enabled.

5. The UE of claim 1, wherein the DCI schedules a downlink channel or a downlink signal in the set of symbols.

6. The UE of claim 5, wherein the downlink channel or the downlink signal is not the semi-static DL scheduling.

7. The UE of claim 1, wherein when the RF signal processing device receives the first configuration of the semi-static DL scheduling and the higher layer parameter from the RRC information, but not receives a second configuration and/or a third configuration from the RRC information, the processor determines not to receive the semi-static DL scheduling in the set of symbols in an event that the RF signal processing device does not receive the DCI.

8. The UE of claim 7, wherein the second configuration provides a slot-format-indicator (SFI) index field in a specific DCI format, and wherein the third configuration provides a channel occupancy (CO) duration field in the specific DCI format.

9. A communication method for semi-static downlink (DL) scheduling, applied to a user equipment (UE), the method comprising:

receiving, by a radio frequency (RF) signal processing device of the UE, a radio resource control (RRC) information; and when the RF receives a first configuration of a semi-static DL scheduling and a higher layer parameter from the RRC information, determining, by a processor of the UE, not to receive the semi-static DL scheduling in a set of symbols in an event that the RF signal processing device does not receive a downlink control information (DCI) for the semi-static DL scheduling from a base station.

10. The communication method of claim 9, wherein the semi-static DL scheduling comprises a periodic channel-state-information reference-signal (P-CSI-RS) resource, a semi-persistent CSI-RS (SP-CSI-RS) resource or a semi-persistent scheduled physical-data shared-channel (SPS-PDSCH).

11. The communication method of claim 9, wherein the first configuration of the semi-static DL scheduling tells the UE to receive the semi-static DL scheduling in the set of symbols according to a periodicity.

12. The communication method of claim 9, wherein the higher layer parameter indicates that a UE behavior to determine how to perform a reception of the semi-static DL scheduling is enabled.

13. The communication method of claim 9, wherein the DCI schedules a downlink channel or a downlink signal in the set of symbols.

14. The communication method of claim 13, wherein the downlink channel or the downlink signal is not the semi-static DL scheduling.

15. The communication method of claim 9, further comprising:

when the RF signal processing device receives the first configuration of the semi-static DL scheduling and the higher layer parameter from the RRC information, but not receives a second configuration and/or a third configuration from the RRC information, determining, by the processor, not to receive the semi-static DL scheduling in the set of symbols in an event that the RF signal processing device does not receive the DCI.

16. The communication method of claim 15, wherein the second configuration provides a slot-format-indicator (SFI) index field in a specific DCI format.

17. The communication method of claim 15, wherein the third configuration provides a channel occupancy (CO) duration field in a specific DCI format.

18. A communication method for semi-static downlink (DL) scheduling, applied to a base station, the method comprising:

transmitting, by the base station, a radio resource control (RRC) information and a downlink control information (DCI) for the semi-static DL scheduling to tell a user equipment (UE) to receive the semi-static DL scheduling in the set of symbols, wherein the base station transmits a first configuration of a semi-static DL scheduling and a higher layer parameter through the RRC information.

19. The communication method of claim 18, wherein the semi-static DL scheduling comprises a periodic channel-state-information reference-signal (P-CSI-RS) resource, a semi-persistent CSI-RS (SP-CSI-RS) resource, or a semi-persistent scheduled physical-data shared-channel (SPS-PDSCH).

20. The communication method of claim 19, further comprising:

transmitting, by the base station, a second configuration that provides a slot-format-indicator (SFI) index field in a specific DCI format and/or a third configuration that provides a channel occupancy (CO) duration field in the specific DCI format to the UE.

* * * * *